(12) United States Patent
Cameron

(10) Patent No.: US 6,878,314 B2
(45) Date of Patent: Apr. 12, 2005

(54) METHOD FOR AUTOMATIC MANUFACTURE OF AND PRINTING ON ASTIGMATIC CONTACT LENSES AND APPARATUS THEREFOR

(75) Inventor: Robert Cameron, Glenview, IL (US)

(73) Assignee: Novartis AG, Basel (CH)

( * ) Notice: Subject to any disclaimer, the term of this patent is extended or adjusted under 35 U.S.C. 154(b) by 58 days.

(21) Appl. No.: 10/225,062

(22) Filed: Aug. 21, 2002

(65) Prior Publication Data

US 2002/0190405 A1 Dec. 19, 2002

Related U.S. Application Data

(62) Division of application No. 09/160,464, filed on Sep. 24, 1998, now Pat. No. 6,471,891.
(60) Provisional application No. 60/059,932, filed on Sep. 24, 1997.

(51) Int. Cl.[7] .................................................. B29D 11/00
(52) U.S. Cl. .................... 264/1.1; 264/2.1; 264/40.1; 264/132
(58) Field of Search .................... 264/1.1, 2.1, 40.5, 264/132, 40.1; 425/150, 808

(56) References Cited

U.S. PATENT DOCUMENTS

| | | | |
|---|---|---|---|
| 4,582,402 A | 4/1986 | Knapp | 351/162 |
| 4,668,240 A | 5/1987 | Loshaek | 8/507 |
| 5,578,332 A | 11/1996 | Hamilton et al. | 425/555 |
| 5,611,970 A | * 3/1997 | Apollonio et al. | 264/2.5 |
| 5,894,002 A | * 4/1999 | Boneberger et al. | 264/1.36 |
| 5,916,494 A | * 6/1999 | Widman et al. | 264/1.1 |

FOREIGN PATENT DOCUMENTS

| | | |
|---|---|---|
| CA | 1291603 | 11/1991 |
| EP | 262832 | * 4/1988 |
| EP | 0 318 164 | 5/1989 |
| EP | 0 346 032 | 10/1994 |
| EP | 0 685 901 | 8/2001 |
| EP | 0 686 901 | 8/2001 |
| EP | 0 788 871 | 10/2001 |

OTHER PUBLICATIONS

European Search Report.
Supplementary European Search Report.

* cited by examiner

*Primary Examiner*—Mathieu D. Vargot
(74) *Attorney, Agent, or Firm*—Jian S. Zhou; Rob J. Gorman; R. Scott Meece

(57) ABSTRACT

A method of automatic manufacture of an astigmatic contact lens having a toric portion and a ballast portion such that said ballast portion causes the toric portion of the contact lens to properly orient in the eye of the wearer. The toric lenses are manufactured by moving a pallet containing at least half of a casting cup assembly and an information tag under a filling assembly and filling half of a casting cup assembly with liquid monomer, then moving the pallet to a closing assembly and, based on information obtained from the information tag, rotating one or both halves of the casting cup assembly and closing the casting cup assembly. The liquid monomer is then cured thereby creating a toric contact lens.

8 Claims, 7 Drawing Sheets

METHOD FOR AUTOMATIC MANUFACTURE OF AND PRINTING ON ASTIGMATIC CONTACT LENSES AND APPARATUS THEREFOR

This application is a division of U.S. Ser. No. 09/160,464 filed Sep. 24, 1998, now U.S. Pat. No. 6,471,891 which claims under 35 U.S.C. §119(e) of U.S. Provisional Application No. 60/059,932 filed Sep. 24, 1997.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

Attached herewith as Microfiche Appendix A is a microfiche of 468 pages of the computer program ladder flow chart of the present invention. The Microfiche Appendix contains 5 frames.

BACKGROUND OF THE INVENTION

Astigmatism is a defect in the eye that is corrected by a lens with a non-spherical prescription. The prescription, which is usually expressed as cylinder on the patient's prescription order, causes at least a portion of the surface of the lens to have the shape of a toric segment. Hence, such lenses are called toric lenses.

While the posterior surface of a contact lens is generally spherical in configuration, where the lens is to used to correct astigmatism it will have a toric configuration. That is, the curved portion of the posterior of the lens has a major and minor axis; the radius of curvature of the posterior surface of the lens being longer in the major-axis direction than in the minor-axis direction. The result is that rather than being of a spherical configuration, the posterior of the lens has a toric configuration with the major axis running orthogonal to the minor axis. The major diameter of the toric curve is generally smaller in diameter than the overall lens, and is cut into a starting base curve which has a spherical configuration.

The corrective lens must be properly oriented with respect to the eye of the wearer. That is, the intended top of the lens must be at the top of the wearer's eye. For ordinary glasses this presents no problem, because the lens is permanently fixed to the frame at the correct rotational orientation. The ear and nose pieces of the frame assure that the frame and the lens do not rotate with respect to the wearer's eyes. For contact lenses orientation is subject to constant alteration. In the case of contact lenses whose function is to correct astigmatism this is unacceptable.

Soft contact lenses which have been designed for use to correct astigmatism are well known in the art. Generally these lenses rely on some type of ballasting method to cause the lens to ride at the proper location on the eye. An ideal lens for correcting astigmatism has good rotational orientation. That is the intended top of the lens should be located at the top of the wearer's eye when the lens is worn. A small amount of deviation from the correct orientation can be tolerated, provided the lens fitter measures the deviation and takes it into account in the lens's prescription.

An ideal lens also provides for good rotational stability. That is, the lens should remain at a fixed rotational orientation within the eye during the entire wearing period. Furthermore, the lens should assume the same orientation each time it is worn. And, of course, the thinner the lens and the smoother the lens surface, the more comfortably the lens will feel to the wearer.

Lenses in accordance with this invention are preferably soft contact lenses, which may be formed of many materials including hydroxyethylmethacrylate, metallo-organic substances, silicone rubbers and various other materials such as described in U.S. Pat. Nos. 3,503,942 and 3,639,524. The preferred soft contact lenses are hydrophilic; that is, they absorb water and, in fact, the water becomes an integral part of their structure. Hydrophilic contact lenses made in accordance with U.S. Pat. No. 4,405,773 are especially preferred for practicing this invention.

Although contact lenses used for the correction of astigmatism have been around for some time, the costs to manufacture these lenses have not decreased over time. The cost has remained high due to the small number of lenses that are manufactured which is due, in part, to the many different number of lenses needed. For example, if toric lenses are rotationally configured for ballast variations of ten degrees, 36 different lenses may have to be manufactured to take into account the total number of lenses possible for each prescription. This is in contrast to one configuration needed for a non-toric lens. Further, since there are fewer astigmatic prescriptions than regular non-toric prescriptions, the number of toric lenses is even less than the 36-to-1 ration disputed above.

SUMMARY OF THE INVENTION

The invention described herein provides a method of automatically manufacturing toric contact lenses which will greatly reduce the associated costs. By providing a precision, programmable, rotational alignment between the casting cups, toric lenses may be manufactured at similar speeds as non-toric lenses whereby a change in the toric prescription affords no down time of the manufacturing process. The automatic filling and closing machine obtains information about the toric lenses to be manufactured from the pallet containing the casting cups. After the information is communicated to the filling and closing machine, the programmable controller activates the filler and closer machine which then operates to manufacture a particular toric lens having a precise toric rotational alignment. Once a particular number of lenses are manufactured, the programmable controller will obtain new information from the next pallet tag and operate to rotate the casting cup assembly to a new rotational alignment thereby manufacturing toric lenses with a different toric rotational alignment. This process allows the manufacture of multiple toric lenses with different rotational alignments in the same or similar time it would take to make the same number of contact lenses with the same toric rotational alignment. Smaller batches of toric lenses can be manufactured in the same time it takes to manufacture a large batch of the same toric lenses.

It is an object of this invention to provide an apparatus that can accurately fill a molded casting cup with liquid monomer and reassemble the casting cup halves, i.e., front curve and base curve, under a precisely controlled motion while maintaining precision, programmable, rotational alignment between the casting cup halves.

It is another object of this invention to provide a method of manufacturing astigmatic or toric contact lenses by filling one half of a molded contact lens casting cup with liquid monomer and, using a programmable precision filling and closing apparatus, programmed such that the other half of the casting cup assembly is rotatably aligned close to the other half thereby manufacturing a toric contact lens.

It is another object of this invention to provide a method of automatically changing the rotational alignment of the casting cup assembly whereby a new prescription toric lens may be manufactured with zero loss down time or changeover time.

It is another object of this invention to provide a fully-automated printing system to accurately print an axis orientation feature on the front of the contact lens such printing thereby aiding in the proper fitting and stability of the toric contact lens on the wearer's eye.

It is another object of this invention to provide a method of automatically printing an accurate axis orientation feature on a toric lens by inserting a pallet containing toric contact lenses via a conveyor into the printing zone. Then using encoded information, the automatic printing apparatus applies the axis orientation mark to a silicone print pad, the location of the mark determined by the encoded information. Then, the contact lens is held in position so that the axis orientation feature or iris print can be applied. Finally, the casting cup is located for a video inspection, thereby verifying the location of the axis orientation feature on the casting cup.

These and other important features and advantages of the invention will become apparent when viewing the drawings and when described in the detailed embodiment of the invention below.

DETAILED DESCRIPTION OF AN EMBODIMENT OF THE INVENTION

Figure 1:
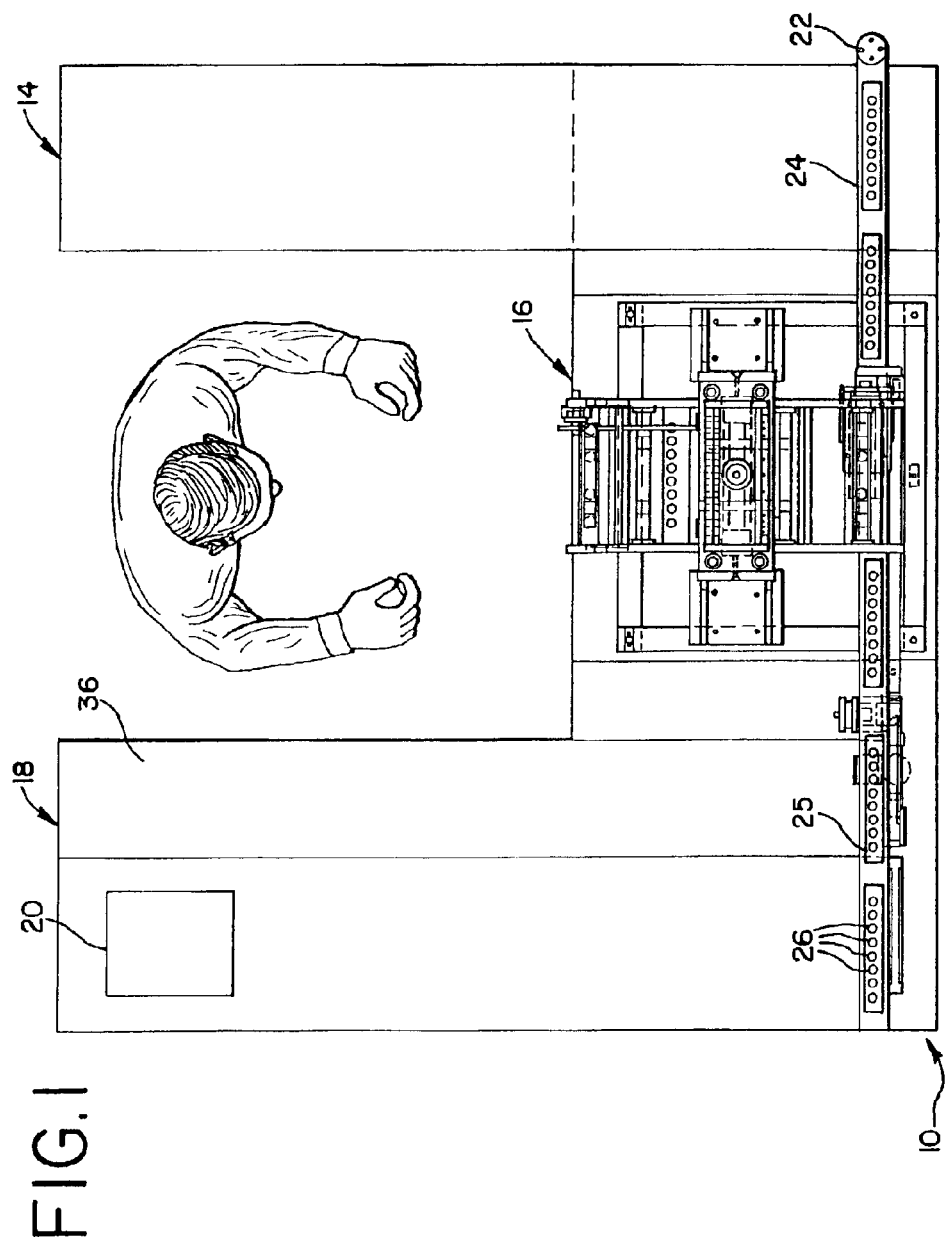
FIG. 1 illustrates a top view of the filling and closing machine in accordance with the present invention.

FIG. 1 shows a top view of the apparatus of the present invention for automatically manufacturing astigmatic or toric contact lenses and printing thereon. The automatic filling and closing machine 10 is made up of the pallet infeed conveyor assembly 14, the toric filler and closer base unit assembly 16, the pallet unload assembly 18, and the programmable controller 20.

Traversing across the dummy infeed conveyor and the pallet infeed conveyor 14 the toric filler and closer base unit assembly 16 and the pallet unload assembly 18 is the pallet conveyor 22. The pallet conveyor moves each pallet 24 from the pallet infeed conveyor 14 to the toric filler and closer base unit assembly 16 for processing and then sends the cure pallet 25 containing the filled casting cup assembly 26 to the pallet unload assembly 18 for further processing. Each pallet 24 contains multiple casting cup assemblies 26, preferably eight which are used to manufacture the toric lenses.

Figure 2:
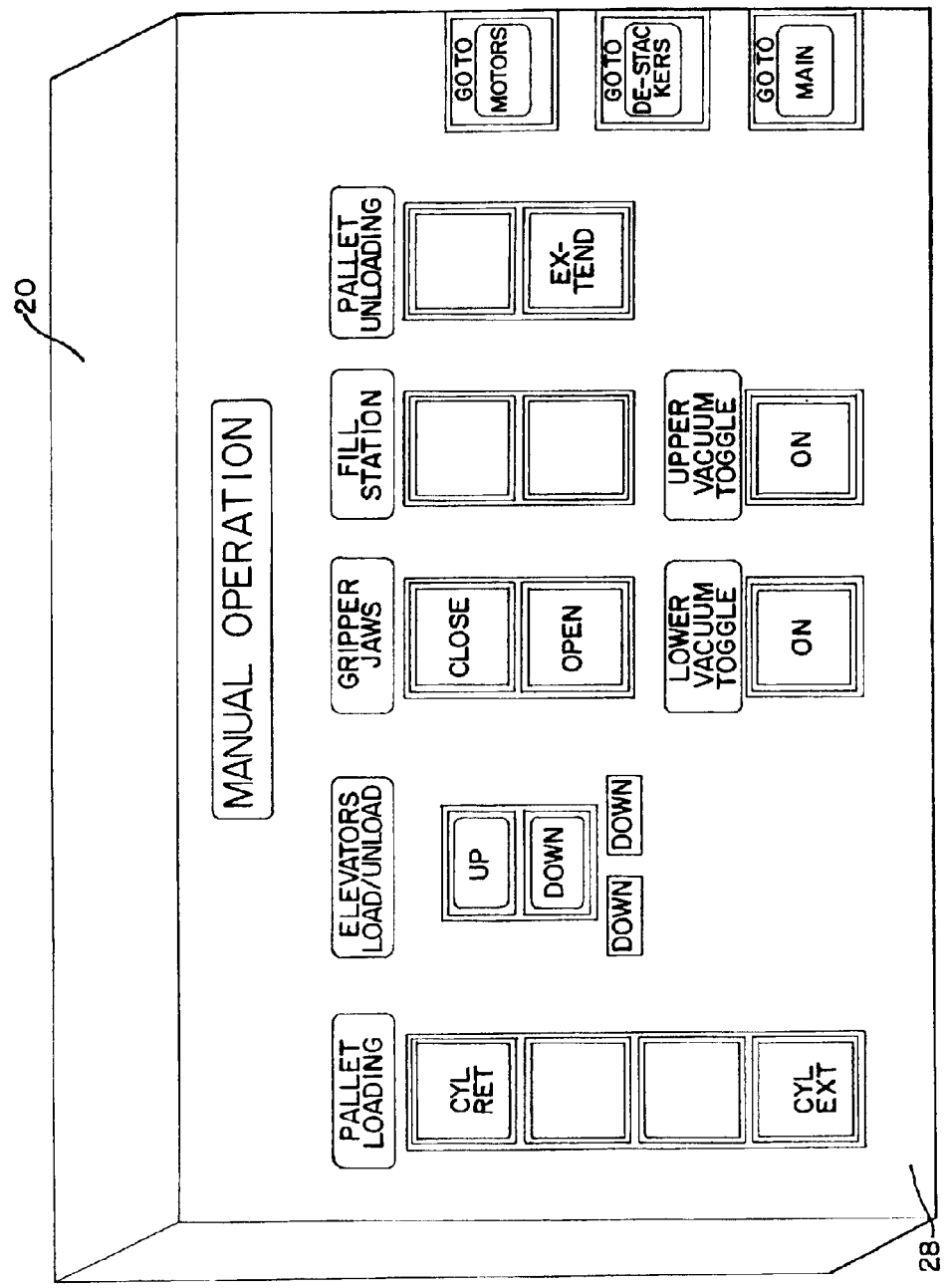
FIG. 2 illustrates a display portion of a programmable controller in accordance with the present invention.
Figure 7:
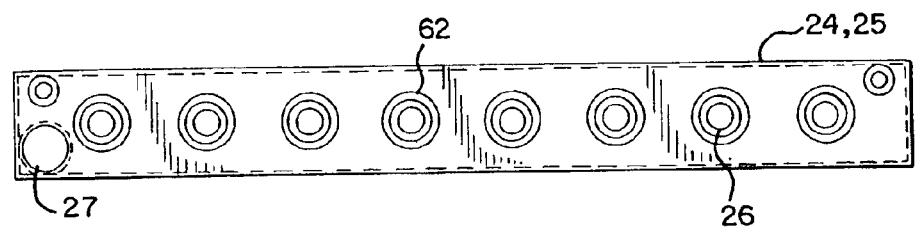
FIG. 7 illustrates a top view of a pallet used in accordance with the present invention.
Figure 8A:
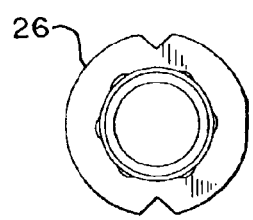
FIGS. 8A and 8B illustrates a top and side view of a casting cup used in accordance with the present invention.
Figure 8B:
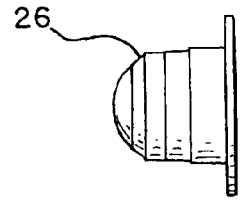
Figure 9:
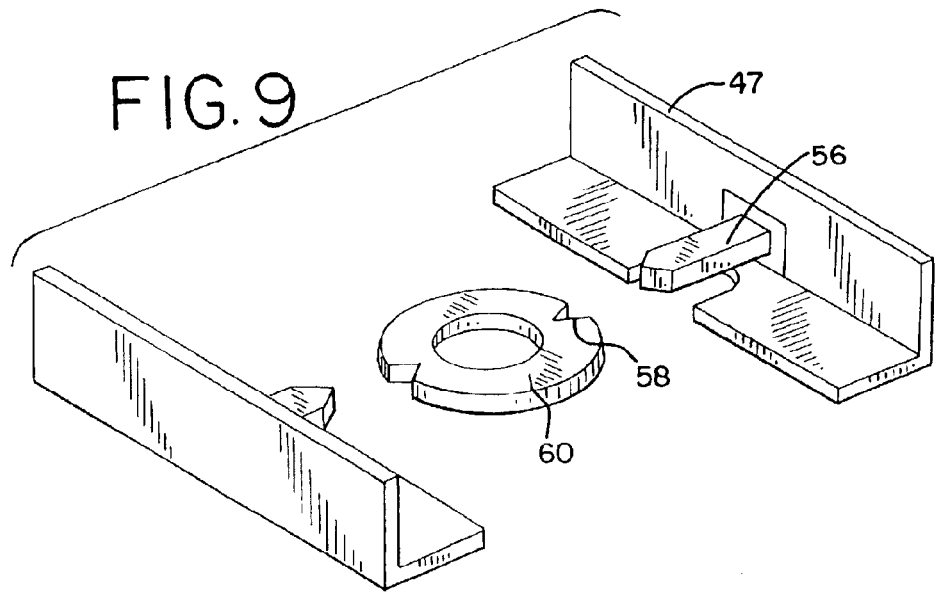
FIG. 9 illustrates the gripper jaws and casting cup flange used in accordance with the present invention.

The programmable controller 20 is located away from the machine 10 thereby allowing maximum accessibility to the production zone by the operator 30. The programmable controller 20 may be one of a number of commercially available controllers, preferably the Allen-Bradley, SLC500 programmable controller using Rockwell Software RSLogix 500 software. The software used to control the filling and closing matching 10 is a ladder-type software protocol. Flow charts for the filling and closing machine and the printing machine are disclosed in Appendix A. The programmable controller 20 uses a touch screen display 28 for input and output of data. The touch screen display 28 is also used in manual operation of the filling and closing machine 10 as shown in FIG. 2. As described below in the automatic filling and closing mode, the proper toric rotational setting is controlled by the programmable controller 20 based on information received by the controller 20 from an information tag 27 (see FIG. 7) attached to the pallet 24. A preferable type of information tag 27 is the inductive tag manufactured by Pepperl-Fuchs along with the Pepperl-Fuchs reader. Other types of information tags may be used such as bar code systems, other readable media and touch memories.

Figure 3:
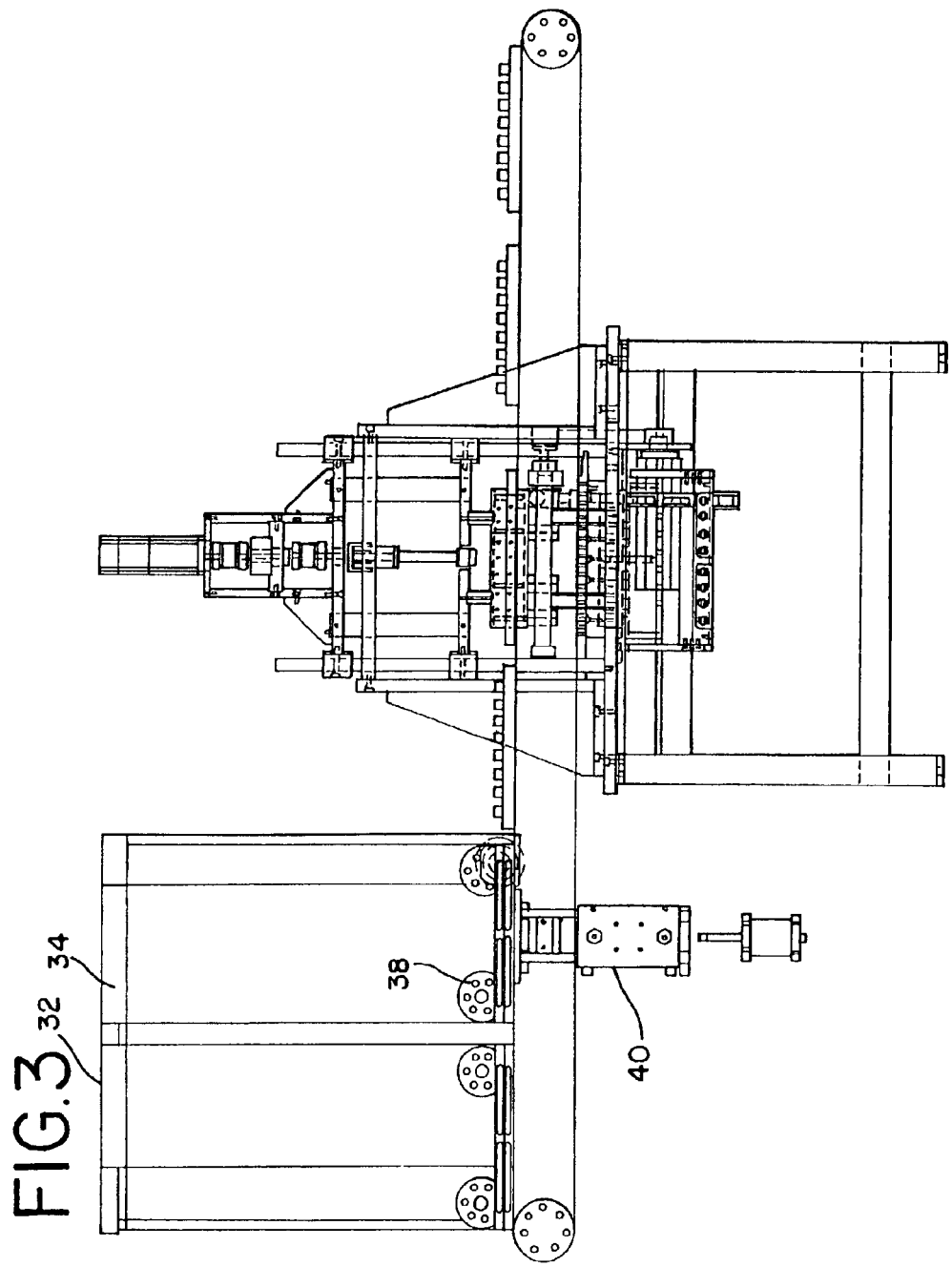
FIG. 3 illustrates a side view of the filling and closing machine

The pallet unload assembly 18 is made up of first destacker 32 and second destacker 34, and the pallet unload conveyor 36 as seen in FIG. 1 and FIG. 3. The pallet unload assembly 18 also utilizes four shot pins 38 and two pneumatic lifts 40. After the filling and closing process is complete, the processed pallet is delivered via conveyor 22 to the pallet unload conveyor 36 for curing.

Figure 4:
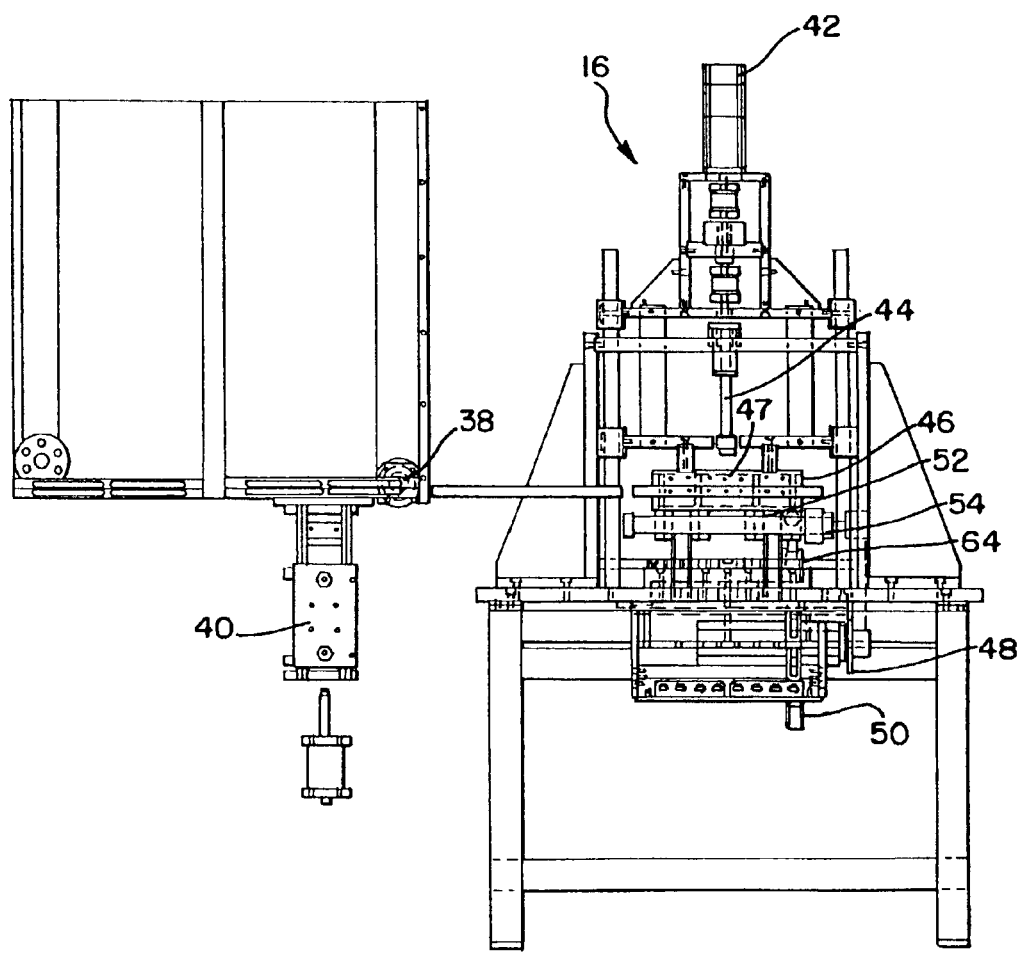
FIG. 4 illustrates a front view of the filling and closing machine accordance with the present invention.

FIG. 4 shows a front view of the filler and closer base unit assembly 16. The base unit assembly 16 contains, among other things, a pick and place closure motor 42, a lead screw 44, and an upper closure head 46 containing gripper jaws 47. The motor 42 used in conjunction with the lead screw 44 lifts and lowers the upper closure head or pick and place head 46 and opens and closes the gripper jaws 47. Also located on the filler and closer base unit assembly 16 is an indexing conveyor servo 48 and a rotary drive stepper motor and controller 50. The filler and closer base unit assembly 16 also utilizes a lot tracking read zone 52 and a lot tracking write zone 54.

The automatic filling and closing machine 10 is used to manufacture astigmatic contact lenses in accordance with the present invention as described below and in reference to FIGS. 1, 3 and 4.

The object of the filling and closing machine 10 is to accurately fill a molded casting cup 26, preferably a front curve-concave casting cup, with liquid monomer and reassemble the casting cup halves, the front curve-concave and the base curve-convex, under a precisely controlled motion while maintaining precision, programmable, rotational alignment between the casting cup halves.

To accomplish this process a pallet or multiple pallets 24 are loaded onto the filling and closing machine 10. Once the controller 20 senses that there are pallets 24 in the correct position on the pallet infeed conveyor 14, the pallet 24 is shuttled into position on the conveyor 22. At the same time the cure pallets 25 have been stacked on one of the destackers 32, 34. A linear actuator, preferably a Barrington Automation linear actuator, will go to its full top stroke meaning that all of the pallets are in the stack and are locked with the shot pin 38. The entire stack is lifted, preferably 30 thousandths of an inch, using the pneumatic lift 40, the pins 38 are then released. The mid-stroke cylinders are fired, they stroke out all the way and the linear actuator will drop. Since the bottom cylinder is stronger than the linear actuator will be stuck in mid stroke. The entire stack will lower, preferably ¾ of an inch, or the thickness of the pallet. Now the shot pins 38 are fired thereby locking the entire stack but allowing the single cure pallet 25 to break away from the stack. The mid-stroke cylinder and linear actuator are retracted all the way which brings the pallet down to a track so that it can be utilized in the process.

Now that the pallet 24 and the cure pallet 25 are ready for use, the close station can be addressed. As the pallet 24 travels along the conveyor 22, it arrives at the filler, preferably an Oyster Bay pump unit. A signal is sent to the pump unit which operates to fill the front curve cup with monomer. The pallet 24 is then located along the conveyor 22 underneath the pick and place head 46. The controller 20 actuates the servo 42, lowering the closure head 46 and closing the jaws 47. The jaws 47 grab the front curve casting cups out of the pallet 24. To effect the grasping by the jaws 47, the jaws 47 contain a V-shaped pin 56 in them. The front curve casting cup flange 60 has female V-notches 58 in them. The V-shaped pins 56 are intended to accurately grasp the flange 60 with no slop or clearance.

With a vertical motion, the jaws 47 strip the front curve casting cup from the holes of the pallet 24. The pallet 24 has special C clips 62 which hold the cups in place allowing only minimal rotation for compliance with the gripper jaws 47 while maintaining angular orientation through the processing.

Next, the gripper jaws 47 place the prefilled front curve casting cups into the lower closure heads 64 (the front curve casting cup does not necessarily need to be prefilled). The lower closure heads have alignment pins, which locate the casting cup flange V-notch 58 accurately in the lower closure heads 64. The cups are held at the V-notches, while placing the V-notch over the locating pins of the lower closure head. The jaws 47 are built to comply with this requirement.

The pallet 24 is affixed with an inductive tag 27 that communicates information to the programmable controller 20. The information communicated to the controller 20 via the Pepperl-Fuchs reader allows the controller 20 to configure the filling and closing machine 10 such that a particular toric lens will be manufactured. Depending on the information communicated the lower closure heads 64 rotate to the proper toric rotational axis setting. Although the machine 10 may hold the lower heads 64 still and rotate the upper heads 46, rotating the lower heads 64 is preferred. The rotation is accomplished by a stepper motor 50 which has an integral encoder for positive position feedback.

The base curve cup is shuttled under the pick and place head 46 and is grasped by the male V-notch gripper jaws 47 and stripped from the pallet 24. The base curve cup is not rotated, since the front curve cup is already at the proper axis setting. The C clips 62 in the pallets perform two functions. They allow only minimal rotation of the cups to comply with the gripper jaws 47 for alignment, and also provide a tight fit of the cups in the pallets 24 to keep them sitting flat and flush while being jostled through the fast moving processing steps.

Next, the jaws 47 close the cup set with a servo-driven, programmable downward motion. This downward motion lifts a cantilevered weight which regulates the closing force. Then the excess monomer is evacuated from the cup cavity thereby completing the closing process. The pick and place head 46 is raised, pulling the cup assembly up. The lower heads 64 rotate back to their zero position and await the next cycle.

The nested conveyor 22 next shuttles the cure pallet 25 under the pick and place head 46 and the cup assembly is placed in the cure pallet 25. The cure pallet 25 also has C clips 62 to control the cups location in the pallet. The cure pallet 25 is then placed onto the conveyor 22 for further processing and the pallet 24 returns to the pallet 24 processing location.

Figure 5:
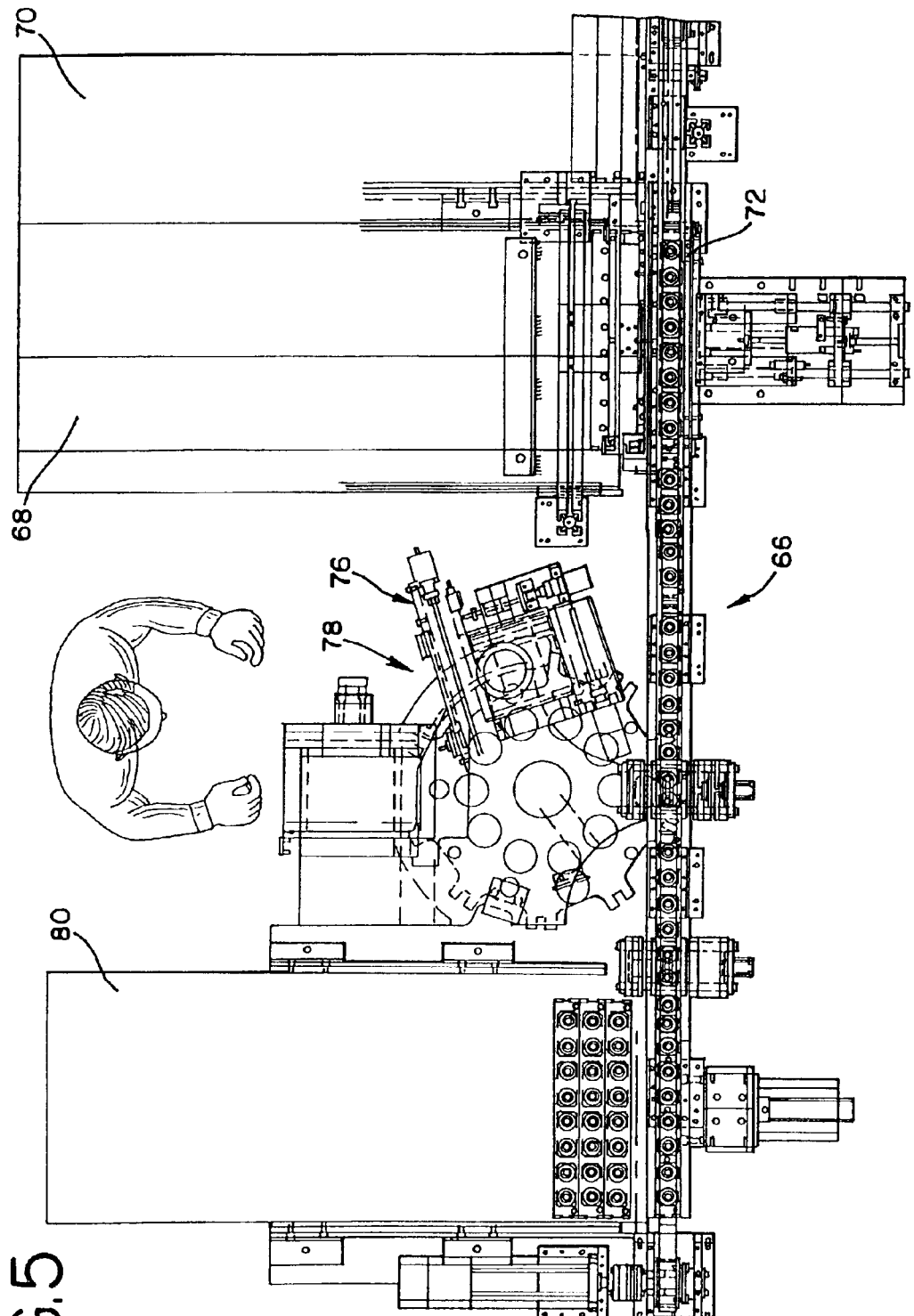
FIG. 5 illustrates a top view of the printing machine in accordance with the present invention.
Figure 6:
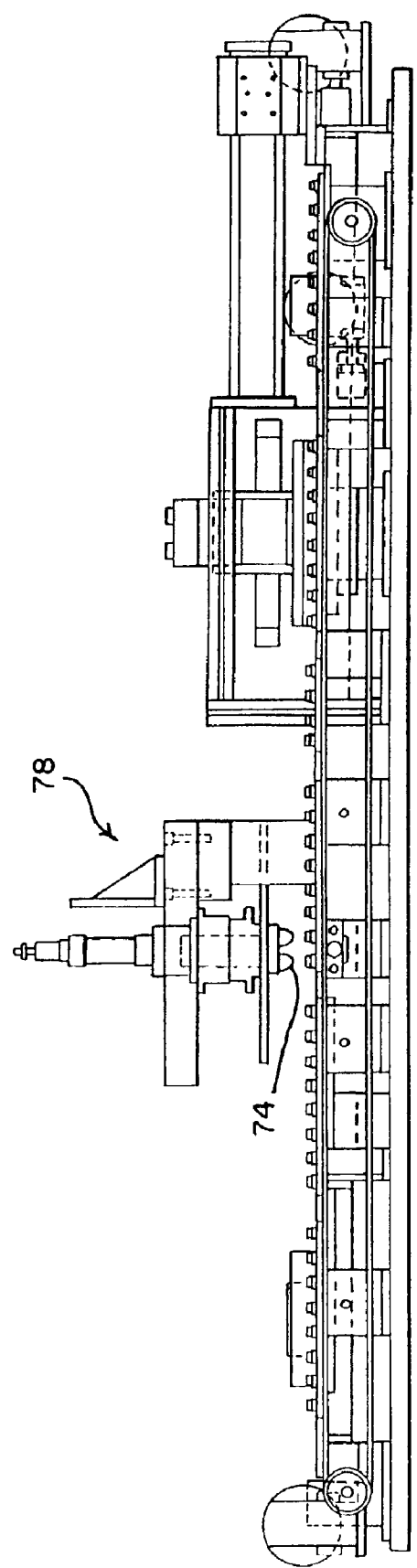
FIG. 6 illustrates a side view of the printing machine in accordance with the present invention.

Once the toric lens has been cured and the casting cup halves are separated it is ready for printing. The printing process is described below and in reference to FIGS. 5 and 6.

The printing process utilizes a fully-automated printing machine 66. The purpose of this machine is to accurately print an axis orientation feature on the front of the contact lens. This aids the doctor in judging proper fit and stability of the lens on the patient's eye.

The printing machine 66 works in conjunction with a pallet design that holds the casting cup half (containing the cured contact lens) by using a press fit procedure. The casting cup is press fit over a base curve configuration on the pallet which has an outside diameter approximately 0.0005 to 0.001 inches larger than that of the inside diameter of the base curve casting cup. Once the casting cup is placed onto the pallet containing the slightly larger diameter, the base curve casting cup will not move an appreciable amount and the lens may then be printed on as described below.

The printing machine 66 can also utilize a pallet design which has a C-clip 62 similar to the description in the filler and closer machine 10. The purpose of the C-clip 62 is to affix and allow only minimal rotation of the base curve casting cup on the pallet. During the time the base curve cup is inserted onto the print pallet, this print pallet C-clip 62 will be aligned to the midpoint of its angular rotation with a shotpin. This alignment is necessary to ensure that the cup can comply to the V-notched gripper jaws 47 which accurately locates the casting cup 26 during printing.

The printer infeed conveyor 68 accepts product pallets 25 coming from the pre-print drying oven and accumulates pallets for processing. Alongside the infeed accumulation conveyor 68 is a second conveyor or dummy infeed conveyor 70 which allows pallets and empty casting cups, without lenses, to be printed. This second conveyor 70 is used to test the location accuracy of the orientation feature without wasting product. Both of these rows of pallets 25 have an inductive or information tag 27 to transfer the lot information and axis setting to the printer controller 20.

Either one of the pallet 25 rows (whichever is being used) will be pushed onto a servo-driven, nested, indexing conveyor 72 to bring the casting cups into the printing zone 78. The indexing conveyor system 72 can be programmed to move pallets 25 through the system differently to adapt to various preferred production scenarios such as speeding up the last pallet out of the system for lot cleanout.

Before the axis orientation mark can be placed on the lens, the mark must be applied to the silicone print pad 74. This is accurately accomplished with an ink delivery system, mounted on top of a motorized X, Y, & THETA positioning system 76. The three axes are driven by stepper motors with integral encoders connected to pre-loaded anti-backslash lead screws capstan design. The slides and rotary bearings are an anti-friction, pre-loaded design to assure maximum accuracy and repeatability to minimize the product's standard deviation.

The rotary cliche station also has a manually-adjusted X&Y dovetail stage on the top of the radius bearing. This stage properly aligns the etched axis orientation mark over the radius bearing. There is also a crosshair etched into the cliche at a precise location from the axis orientation feature, allowing the pre-alignment of the cliché. By adjusting the manual X&Y dovetail slides to align the crosshair on the cliche plate with the crosshair in a short-range telescope or fiber-optic camera and monitor setup, one can pre-align the cliche. Once properly adjusted, the cliche station can be rotated to a new axis orientation setting for each lot without having to adjust X&Y. This will increase efficiency and printing accuracy to maximize yield.

There are two cup locator stations. The first station locates and holds the casting cup to have the axis orientation feature or iris print applied. Since the front curve casting cup half is rotatably aligned during the filling and closing stage, the axis orientation is rotated at printing to match the filling and closing rotational alignment. The second station locates the casting cup for use with a video inspection station. The inspection station will verify the location of the axis orientation feature on the casting cup. This system will also use the information to dynamically adjust the X, Y, and THETA positions, if required, on the motorized rotary cliche station. The system allows for self-correction and enables reliable production without the constant attention of an operator.

Both locating stations have male V-notches which grasp the casting cup on the female V-notch 58 of the flange 60. The pallets 25 are then pushed off the nested, indexing conveyor 72 onto the unload conveyor 80 which allows for any additional processing.

While the invention has been described in connection with a preferred embodiment, it is not intended to limit the invention to the particular embodiment set forth, but, on the contrary, it is intended to cover such alternatives, modifications, and equivalents as may be included within the spirit and scope of the invention as defined by the appended claims.

What is claimed is:

1. A method for cast molding a plurality of toric contact lenses having a desired astigmatism-correcting characteristic, the process comprising:
   (a) providing a pair of casting cup halves having the astigmatism-correcting characteristic defined by an assembled relative rotational alignment of one casting cup half with respect to the other casting cup half;
   (b) filling one of said casting cup halves with liquid monomer material;
   (c) reassembling the casting cup halves under a precisely controlled motion while maintaining the rotational alignment between the casting cup halves;
   (d) curing said liquid monomer material thereby molding the material into a toric contact lens having the desired astigmatism-correcting characteristic;
   (e) separating said casting cup halves such that the toric contact lens remains with one of the casting cup halves;
   (f) holding the casting cup half having the toric contact lens;
   (g) applying an iris print to the toric contact lens;
   (h) locating the casting cup half with the toric contact lens;
   (i) passing the toric contact lens to a video inspection station; and
   (j) verifying the iris print applied to the toric contact lens by video inspection.

2. The method of claim 1 further comprising generating video inspection information from the video inspection station, and adjusting the position of the iris print in response to the video inspection information.

3. The method of claim 1 wherein a programmable controller controls the motion for reassembling the casting cup halves.

4. The method of claim 3 wherein the step of reassembling further comprises the step of rotating one of said casting cup halves relative to the other casting cup half to obtain the desired assembled relative rotational alignment, and then maintaining the rotational alignment, thereby obtaining the desired astigmatism-correcting characteristic in the toric contact lens.

5. A method for applying an iris print on a cast-molded toric contact lens, the method comprising:
   (a) cast-molding a toric contact lens in a pair of casting cup halves;
   (b) separating the casting cup halves such that the toric contact lens remains on one of the casting cup halves;
   (c) placing a pallet containing an Information tag and the casting cup half with the toric contact lens onto a conveyor;
   (d) locating the pallet into a printing zone;
   (e) holding the casting cup with the toric contact lens in a predetermined position;
   (f) applying the iris print to the toric contact lens;
   (g) locating the casting cup half with the toric contact lens;
   (h) passing the toric contact lens to a video inspection station; and
   (i) verifying the iris print applied to the toric contact lens.

6. The method of claim 5 further comprising generating video inspection information from the video inspection station, and adjusting the position of the iris print in response to the video inspection information.

7. The method of claim 5 further comprising a step of transferring information from said information tag to a print controller, wherein said information includes at least one of a lot information and an axis setting.

8. The method of claim 7 wherein said step (f) is performed by positioning a print pad to correspond to the axis setting and transferring the iris print mark from the print pad onto the contact lens.

* * * * *